US007515997B2

(12) United States Patent
Imai

(10) Patent No.: US 7,515,997 B2
(45) Date of Patent: Apr. 7, 2009

(54) METHOD OF IDENTIFYING MOVING BODIES

(76) Inventor: Akira Imai, 249-17, Kashiwabara, Hotaka, Azumino-shi, Nagano (JP) 399-8304

( * ) Notice: Subject to any disclaimer, the term of this patent is extended or adjusted under 35 U.S.C. 154(b) by 507 days.

(21) Appl. No.: 10/563,327

(22) PCT Filed: Jun. 10, 2004

(86) PCT No.: PCT/JP2004/008119

§ 371 (c)(1),
(2), (4) Date: Dec. 30, 2005

(87) PCT Pub. No.: WO2005/006275

PCT Pub. Date: Jan. 20, 2005

(65) Prior Publication Data

US 2006/0155428 A1 Jul. 13, 2006

(30) Foreign Application Priority Data

Jul. 9, 2003 (JP) ............................ 2003-272217

(51) Int. Cl.
*G08G 1/00* (2006.01)
*G06F 19/00* (2006.01)

(52) U.S. Cl. .......................... 701/1; 701/207; 701/300; 340/436; 455/456.1

(58) Field of Classification Search .................... 701/1, 701/2, 300, 301, 205, 206, 207, 213; 455/456.1; 340/435, 436, 903
See application file for complete search history.

(56) References Cited

U.S. PATENT DOCUMENTS 5,999,880 A 12/1999 Okada et al.
6,012,012 A * 1/2000 Fleck et al. ................ 701/117
6,397,141 B1 * 5/2002 Binnig ....................... 701/117
6,742,037 B1 * 5/2004 Hall et al. .................. 709/228

FOREIGN PATENT DOCUMENTS

| | | | |
|---|---|---|---|
| JP | 10-148665 | A | 6/1998 |
| JP | 11-283180 | A | 10/1999 |
| JP | 2001-358641 | A | 12/2001 |
| JP | 2002-198886 | A | 7/2002 |
| JP | 2003-115095 | A | 4/2003 |

OTHER PUBLICATIONS

International Search Report dated Jul. 27, 2004.

* cited by examiner

*Primary Examiner*—Tan Q Nguyen
(74) *Attorney, Agent, or Firm*—Buchanan Ingersoll & Rooney PC

(57) ABSTRACT

There is provided a method of identifying a plurality of moving bodies that are present nearby, wherein each moving bodies includes means for transmitting, as advance information, a movement state including an operation instruction received by the moving body, together with identification information of the moving body and means for monitoring the behavior of other moving bodies, the method including: a step of causing at least one of the plurality of moving bodies to carry out, as a target moving body, a reveal operation that enables the behavior of a target moving body to be differentiated from other moving bodies; and a step of detecting the reveal operation by the means for monitoring of the other moving bodies and identifying the plurality of moving bodies by grasping positions relative to the target moving body. By using this method of identifying, it is possible to precisely identify vehicles moving in the periphery and to control vehicles safely while predicting the behavior of other vehicles.

6 Claims, 2 Drawing Sheets

METHOD OF IDENTIFYING MOVING BODIES

TECHNICAL FIELD

The present invention relates to a method of identifying moving bodies, such as a plurality of vehicles that are present nearby, such as on an expressway.

BACKGROUND ART

To solve various road traffic-related problems such as traffic accidents and traffic jams, an expressway traffic system (ITS or Intelligent Transport System) that is a new road traffic system that makes full use of the latest information technology has been developed.

To prevent road accidents from occurring from the outset, it is important to detect the behavior of the vehicle in front using an appropriate sensor so that a suitable distance can be maintained between vehicles and/or the speed of the present vehicle can be controlled. It is also important to keep the distance between vehicles constant when carrying out automatic control of a group of vehicles moving in a formation. However, if an action to be taken by the present vehicle is determined after first observing the behavior of other vehicles, there is the possibility of action being taken too slowly, and to avoid such risks, it is necessary to maintain sufficient distance between the vehicles. On the other hand, if a large distance is maintained between vehicles, it becomes difficult to monitor the behavior of other vehicles. Although it depends on the type of sensor, the sensitivity of a magnetic sensor greatly falls as the distance between vehicles increases. With an optical sensor or a sensor that uses ultrasound, in adverse weather conditions such as rain, snow, and sandstorms, obstacles are present between the vehicle and other vehicles which results in a reduction in sensitivity, with such reduction becoming larger as the distance between vehicles increases.

Instead of monitoring the behavior of other vehicles using a sensor or in addition to doing so, if it were possible to obtain in advance operation information for other vehicles, for example, information showing that the brakes have been operated to cause deceleration, that the accelerator has been operated to cause acceleration, that the steering wheel has been operated to change the course, or that the gears have been operated, it would be possible to predict the behavior of the other vehicles and therefore traveling could be made much safer. In this case, if such advance information is merely obtained, it will not be possible to make full use of the information, and it will be necessary to determine which of the vehicles moving in the periphery the advance information applies to. As the identification information of vehicles, each vehicle has a unique registration number which can be known by looking at the number plate. Japanese Laid-Open Patent Publication No. 2003-115095 discloses a technology where the driver confirms the presence of a vehicle that the driver wishes to follow using a vehicle number, control information on the lead vehicle in that vehicle group is received, and the speed of the present vehicle is controlled.

However, it is difficult to verify the number plate in a state where there is a considerable distance between vehicles. Also in adverse weather conditions, it is difficult to correctly identify a number plate with the naked eye or even with a highly sensitive sensor. In addition, when a vehicle is moving alongside the present vehicle, the number plate is physically not visible and therefore the registration number cannot be known. Even though it may be possible to specify vehicles in the periphery to an extent from the model or color, such method is not very reliable.

It is also possible to assign identification information that is suited to exchanging data by communication, such as IP addresses, and by wirelessly broadcasting operation information for the present vehicle or transmitting such information using a wireless LAN, such information can be provided to other vehicles in the periphery comparatively easily. Also, if there is a central control system that controls the traffic, such information can also be provided to other vehicles via the central control system. However, even if identification information such as IP addresses is used, it is not easy to identify other vehicles. If a radar system is installed in each vehicle, it may be possible to identify other vehicles in a range given by the definition of the radar, but it is not economical to install a radar with a definition of several meters or less. Although it may be possible to raise the resolution by using an optical system, the effectiveness of such system is questionable in adverse weather conditions. While GPS that measures radio waves from satellites to calculate the position of the present vehicle is also effective, there is not sufficient precision to clearly differentiate the positions of a plurality of vehicles that are near one another. Using a method such as electric waves that have little directivity, although it is possible to transmit the identification information of the present vehicle to nearby vehicles or a central control system that controls a plurality of vehicles, it is not possible to specify the relative positions of a plurality of vehicles.

For this reason, in the present invention, a method of precisely identifying vehicles moving side-by-side in the periphery using a simple system is provided. In addition, it is an object to provide a system that can control a vehicle even more safely using advance information from other vehicles.

DISCLOSURE OF THE INVENTION

In the present invention, a method of identifying a plurality of moving bodies, wherein each moving body includes means for transmitting, as advance information, a movement state including an operation instruction received by the moving body, together with identification information of the moving body and means for monitoring the behavior of other moving bodies, the method including: a step of causing at least one of the plurality of moving bodies to carry out, as a target moving body, a reveal operation that enables the behavior of the target moving body to be differentiated from other moving bodies; and a step of detecting the reveal operation by the means for monitoring of the other moving bodies and identifying the plurality of moving bodies by grasping relative position of the target moving body. The target moving body can transmit, to other moving bodies, an operation instruction of a reveal operation received by the target moving body as advance information together with identification information of the target moving body. Accordingly, by identifying a moving body whose relative behavior matches the reveal operation received as the advance information, other moving bodies can grasp their relative positional relationship with the target moving body. For example, when nine vehicles made up of three vehicles moving along three lanes are moving in a group at a constant speed, the vehicle in the center carries out a reveal operation, such as a reduction in speed, as the target moving body, the other vehicles in the periphery positioned in front, behind, to the left and right, and on the diagonals detect the reveal operation to identify the target moving body, and therefore the position of every other vehicle relative to the target vehicle can be known. Accordingly, all nine vehicles can be properly specified.

Here, it is possible to grasp that the plurality of vehicles moving in a group are near one another from position information provided by GPS, for example. By using a method such as tracing the movement paths of the respective vehicles, it is also possible to know the approximate movement positions of the respective vehicles. When the positions of the respective vehicles that must be present somewhere nearby are apart by a distance that exceeds the range of tolerance for measuring such positions, it may not be difficult to specify the respective vehicles present nearby from the position information of the respective vehicles. Accordingly, if vehicles start moving in a group after the vehicles in front, behind, and to the left and right have been identified, there is the possibility that such vehicles will remain in the state where they were identified. However, there is always the possibility that the vehicles will start moving in a group within the range of tolerance for the position information. Also, even if the vehicles start moving in a group in a state where the relative positional relationships have been identified, it is important to confirm whether the relative position relationship is correct.

The reveal operation carried out by the target moving body is an operation that makes it possible to differentiate the behavior of the target moving body from the other vehicles within a range that is safe with respect to the other vehicles in the periphery. The reveal operation differs to the wireless broadcasting of identification information in that by using a periphery monitoring system that is provided in each moving body and monitors the behavior of other moving bodies, it is possible to clearly specify which target vehicle carried out the reveal operation. For example, if vehicles are moving in a group at a constant speed, an operation that slightly increases or decreases the speed will cause a change in the distance between the present vehicle and other vehicles in the periphery without causing discomfort to the passengers, and is therefore suited to a reveal operation. Also, since the distance between vehicles is the most fundamental monitored value, such reveal operations are easy for other vehicles to grasp regardless of day or night and adverse weather conditions. Operating the steering wheel to change course within a safe range can also be used as a reveal operation. However, such operation may make the passengers feel unsafe. It is also possible to flash the headlights or flash the indicators as a reveal operation, but there is the possibility during the day that other vehicles will not be able to grasp such operation and such operations have the possibility of meaning something else, and for these reasons, such operations are not very suited to a reveal operation.

It is also possible to perform a large movement such as changing lanes as a reveal operation. However, since the object of the present invention is to cause a moving body to move safely by having a periphery monitoring system installed in each moving body obtain an operation as advance information and actively or positively respond before it would be possible to passively detect such operation and respond, operations such as changing lanes that require other moving bodies to respond are not suited to reveal operations.

According to the present invention, reliability of identifying moving bodies that are moving in a group increases. In addition to the regular movement state, such as the speed and direction of motion, information including an operation instruction received by another moving body, such as a lane change, acceleration, deceleration, and braking, is obtained from the other moving body as advance information so that the present moving body can be appropriately controlled before the behavior of the other moving body is clearly understood. For example, when a vehicle moving in front carries out a sudden braking due to a vehicle in front of that or some other circumstance, the following vehicles can decelerate according to advance information for the operation of the brakes or advance information for an operation instruction for a sudden halt. Therefore, Delay in the braking operation of the following vehicles is minimized. In addition, even if the vehicle moving in front suffers a break defect or a lamp defect or slips on the road, for example, it is possible for the following vehicles to respond quickly and appropriately, and even if the distances between the vehicles moving in a group are short, the vehicles will still be able to move safely. The advance information may be directly received from other moving bodies wirelessly or otherwise, or may be received via a central control system that controls the movement of the moving bodies.

A movement control system for moving bodies included in the present invention includes: means for providing, as advance information, a movement state including an operation instruction received by a present moving body, together with identification information for the present moving body, to other moving bodies and/or a central control system and for obtaining advance information of other moving bodies; means for obtaining periphery information including the behavior of other moving bodies; control means for generating an operation instruction based on the advance information and/or the periphery information; means for outputting an operation instruction for carrying out a reveal operation that enables the behavior of the present moving body to be differentiated from the other moving bodies as a target moving body; means for detecting a reveal operation of another moving body based on the periphery information and determining a position of the present moving body relative to the target moving body; and means for transmitting the position of the present moving body relative to the target moving body together with the identification information to other moving bodies and/or the central control system. By installing a movement control system in each moving body, it is possible to obtain the relative positions of other moving bodies and identification information of other moving bodies. This means, by receiving advance information including identification information that are broadcast from other moving bodies or central control system without specifying a moving body, predicting the behavior of respective moving bodies from the advance information of the moving bodies moving in the periphery becomes possible, and therefore a moving body can be controlled safely.

The advance information of other moving bodies in the periphery that are associated with relative positional relationships can also be provided to a moving body by a central control system. When a process that identifies a plurality of moving bodies moving in a group creates a large load for an information processing system installed in a moving body, it is effective to have the process carried out by a central control system that monitors and/or controls the movement of a plurality of moving bodies. A central control system included in the present invention includes: means for obtaining, from a plurality of moving bodies that are present nearby, an operation instruction received by each moving body together with identification information of the moving body, and providing the obtained information to other moving bodies as advance information; and means for instructing at least one moving body out of the plurality of moving bodies to carry out a reveal operation that enables the behavior of the at least one moving body to be differentiated from other moving bodies as a target moving body. In addition, the central control system may further include means for obtaining information from means for monitoring other moving bodies provided in the respective moving bodies, detecting the reveal operation, and identifying the plurality of moving bodies by grasping positions thereof relative to the target moving body.

In this way, according to the method of identifying moving bodies in the present invention, a target moving body is caused to carry out a reveal operation, such behavior is detected by periphery monitoring means of other moving bodies, relative positions of a plurality of moving bodies are identified, and therefore the plurality of moving bodies can be completely identified. Accordingly, an expensive system such as a radar apparatus with high sensitivity is not required to identify moving bodies. In addition, by using a system that monitors the behavior of other moving bodies in the periphery it is possible to identify respective moving bodies with high precision regardless of day or night or adverse weather conditions. A system that monitors the behavior of other moving bodies in the periphery already needs to be installed in virtually every moving body to realize an ITS, basing on that, the present invention may provide complete identifying moving bodies in the periphery without an increase in hardware.

BEST MODE FOR CARRYING OUT THE INVENTION

Figure 1:
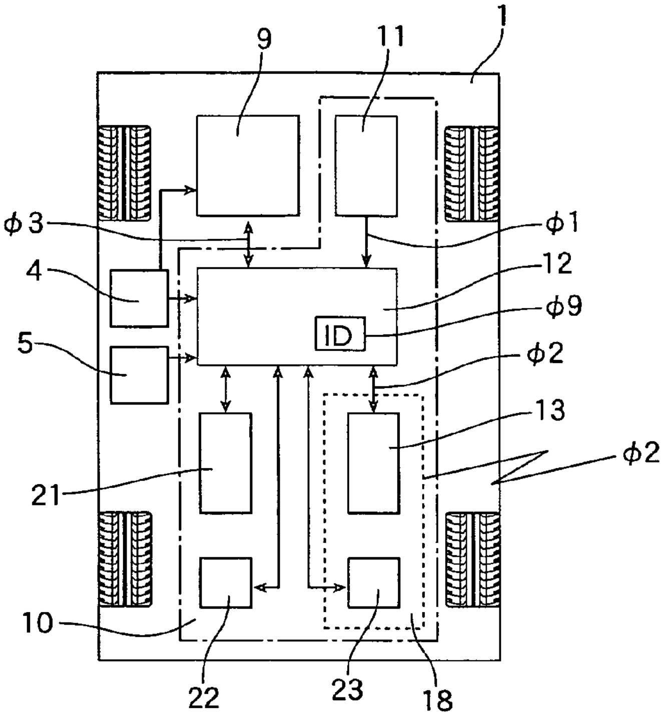
FIG. 1 is a block diagram showing one example configuration of a movement control system included in the present invention.

FIG. 1 shows one example of a vehicle for which the method of identifying moving bodies included in the present invention can be applied. This vehicle 1 is a four-wheel automobile, and includes a driving mechanism 9 that drives the automobile 1 and controls the behavior of the automobile 1, such as the direction of movement, an operation terminal 4 for allowing a passenger (the user) of the vehicle to control the driving mechanism 9, and a movement control system 10 that backs up the functions of the operation terminal 4 and can improve the safety of the passengers by overriding instructions from the operation terminal 4 when necessary. The driving mechanism 9 includes an engine, gears, a deceleration mechanism, an acceleration mechanism, a steering mechanism, and the like, and the operation terminal 4 includes switches, levers, a steering wheel, and the like to operate the driving mechanism 9. The movement control system 10 includes a periphery monitoring system 11 that obtains periphery information $\phi$1 including the behavior of other vehicles, a control system 12 that generates an operation instruction for controlling the present vehicle 1 based on the periphery information, and an advance information exchanging system 13 that wirelessly supplies the operation instruction as advance information $\phi$2 together with identification information (ID) $\phi$9 of the vehicle to other vehicles and/or a central control system and obtains the advance information of other vehicles. The control system 12 generates operation instructions based not only on the periphery information $\phi$1 but also the advance information $\phi$2 of other vehicles. In addition, information showing whether the user has operated the accelerator, brake, steering wheel and the like of the operation terminal 4, and information from a car navigation system 5 equipped with GPS are also supplied to the control system 12, an operation instruction $\phi$3 is generated by processing such information according to appropriate control logic, and thereby the driving mechanism 9 that drives and controls the automobile 1 is operated.

The movement control system 10 also includes a reveal operation instruction function 21 that outputs a reveal operation instruction $\phi$3 that causes the present vehicle 1 to operate as a target moving body (a target mobile), and a target identifying function 22 that detects a reveal operation of another vehicle from the periphery information $\phi$1 and when another vehicle is the target moving body, determines the position of the present vehicle relative to the target vehicle. These functions 21 and 22 are realized by a computer including suitable performance that is installed in the vehicle together with the control system 12, with the computer also controlling a communication system and the like described below. The movement control system 10 also includes an identification information exchanging system 23 that wirelessly provides information on the position of the present vehicle relative to the target together with the ID $\phi$9 of the present vehicle to other vehicles or to the central control system and obtains the relative positions of other vehicles in the periphery and respective identification information thereof. The advance information exchanging system 13 and the identification information exchanging system 23 are realized by a communication system 18 that can transmit and receive information using an appropriate wireless method. One favorable example of such wireless method is a wireless LAN, and by using IP addresses as the identification information $\phi$9 of the respective vehicles 1, the advance information $\phi$2 and the identification information $\phi$9 can be exchanged with other vehicles and/or the central control system together with various other information. Also, by connecting to the Internet using the communication system 18, it is possible to obtain and transmit various other types of information that are not limited to vehicle information. Also, it may also be possible to provide the advance information and identification information using a road traffic information communication system (VICS) that provides information to the car navigation 5.

Figure 2:
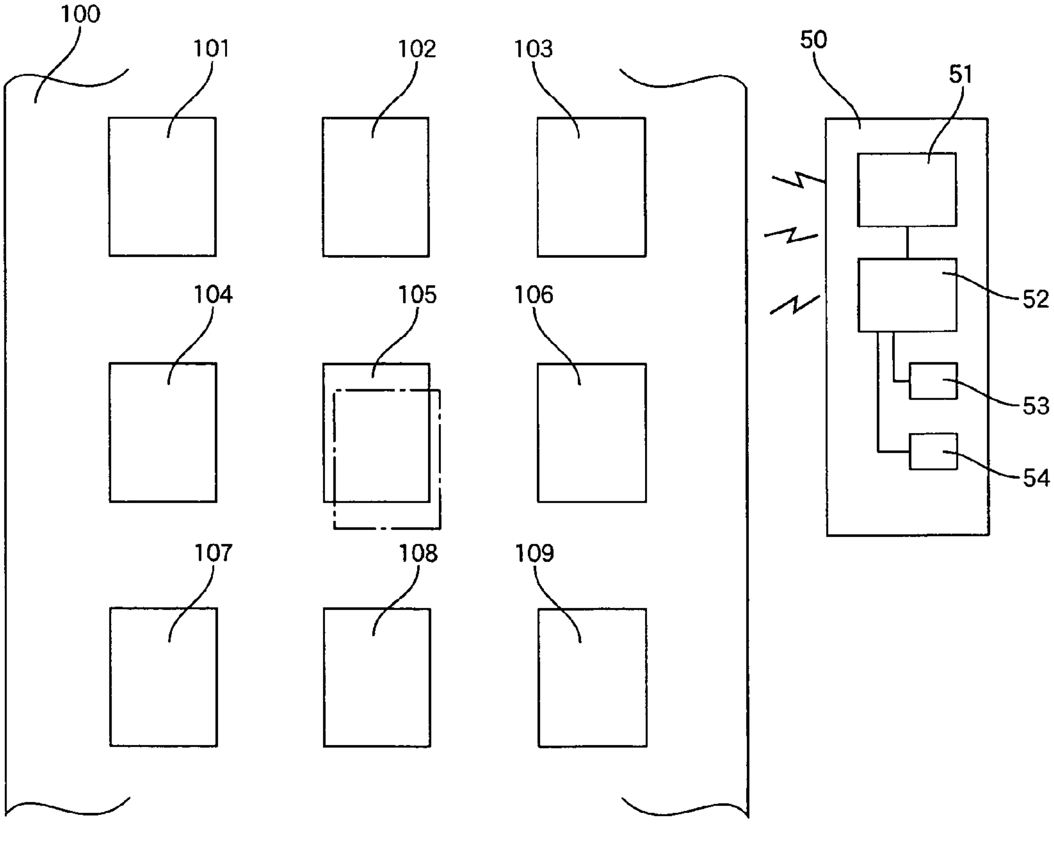
FIG. 2 is a diagram showing an example application of the method of identifying moving bodies included in the present invention.

A process that determines the relative positions of a plurality of vehicles using a reveal operation will now be described with reference to FIG. 2. In FIG. 2, a state where nine vehicles 101 to 109 are moving in a group at a fixed speed on a three-lane road 100 is shown. Here, suppose that the reference numerals assigned to the vehicles 101 to 109 are used as the identification information $\phi$9. Here, it can be determined that the vehicles 101 to 109 are moving side-by-side close to each other from the present positions found by the car navigation systems 5 installed in the respective vehicles being substantially the same, and therefore candidates for the vehicles moving in the periphery can be easily detected out of the large number of vehicles on the road 100.

Here, the center vehicle 105 is supposed as a target, an instruction is outputted from the reveal operation instruction function 21 to have the vehicle 105 carry out a reveal operation that is a slight reduction in speed. A reveal operation is not limited to deceleration as described above, and may be acceleration or a steering operation. A reveal operation that causes a change in speed within a range that does not cause danger to other vehicles or cause worry or discomfort for the passengers is one example of an optimal reveal operation for the present invention. The passengers of the vehicle 105 should preferably be informed by an appropriate method that the target 105 is carrying out a reveal operation. For example, when the reveal operation instruction function 21 outputs an instruction for the reveal operation, an indication showing that a reveal operation is being carried out, may be displayed on a display panel at the driver's seat. By informing the passengers that a reveal operation is being carried out, it is possible to prevent the passengers from feeling concerned about the movement of the vehicle, and also possible to prevent the passengers from carrying out an operation that cancels the reveal operation.

If the target vehicle 105 decelerates in a state where the vehicles 101 to 109 are moving side-by-side at a fixed speed, the position of the vehicle 105 relative to the other vehicles 101 to 104 and 106 to 109 will change as shown by the dot-dash line. Accordingly, the target identifying function 22 of the other vehicles 101 to 104 and 106 to 109 can specify the target 105 that has carried out the reveal operation based on the periphery information φ1 obtained from the periphery monitoring system 11. Accordingly, it is possible for the respective vehicles to detect the positional relationship with respect to the target 105, and to specify the position of the present vehicle within the group of moving vehicles. For example, the vehicle 101 that can see the target 105 diagonally behind to the right is positioned to the left of the vehicle 102 that can see the target 105 directly behind and is positioned in front of the vehicle 104 that can see the target 105 alongside to the right. In the same way, by determining the positional relationship of the present vehicle relative to the target 105, the relative positional relationships of all of the vehicles 101 to 104 and 106 to 109 can be clearly determined. By exchanging the identification information φ9 and the positional relationships relative to the target using the identification information exchanging system 23, the respective vehicles 101 to 109 can completely identify all the vehicles in the periphery and each vehicle can be controlled correctly using the advance information φ2 supplied from the respective vehicles.

The reveal operation is not limited to only deceleration and may carry out deceleration and acceleration once or a plurality of times. Even if the vehicles 101 to 109 were moving at slightly different speeds or the relative speeds of the vehicles slightly changed, since the timing at which the target 105 carries out a reveal operation is supplied to the other vehicles 101 to 104 and 106 to 109 in the periphery as the advance information φ2, based on the behavior of the relative position for the present vehicle given by the advance information φ2 of the target and the timing at which the behavior is detected, the target identifying function 22 can precisely detect the target 105. By repeatedly decelerating and accelerating, the number of opportunities for identifying the target 105 increases, which makes it easy to distinguish the behavior of other vehicles and makes it possible to identify the target even more precisely.

Such a reveal operation of the target 105 can be identified using the periphery information φ1 from the periphery monitoring systems 11 of the other vehicles 101 to 104 and 106 to 109. In particular, since a function that monitors the distances between vehicles and a function that determines the state of vehicles moving alongside should be essential functions that prevent collisions with other vehicles and ensure the safety of the present vehicle, the behavior of the target 105 will be obtained by the functions of a monitoring system to be installed in the respective vehicles for realizing an ITS without adding much hardware. In addition, since the periphery monitoring system 11 installed in a vehicle is equipped with a function that can monitor the motion of other vehicles regardless of day and night and adverse weather conditions such as rain, snow, fog, and sandstorms, the reveal operation of the target 105 can be reliably identified in any conditions, which means that the vehicle identification method of the present invention has extremely high reliability.

The decision as to which of the vehicles 101 to 109 that are moving in a group is to be set as the target vehicle can be made according to an appropriate method among the vehicles 101 to 109 that are determined to be moving in neighborhood. As examples, it is possible to hold a vote to decide which of the vehicles 101 to 109 is to be the target or to determine the target vehicle using a random number. In the example shown in FIG. 2, it is most efficient to set the vehicle 105 as the target. As in a case where the vehicle 101 is first set as the target, the relative relationship of the vehicles 102, 105 and 104 is determined, and then the vehicle 105 is set as the target and another reveal operation is carried out, it is possible to repeatedly carry out the vehicle identification process while changing the vehicle set as the target.

When there is a control system 50 that centrally controls the vehicles moving on the road 100, the central control system 50 can designate a vehicle to be the target and determine the arrangement of the group of vehicles based on the periphery information φ1 of the respective vehicles obtained from the vehicles 101 to 109. The central control system 50 shown in FIG. 2 includes a communication system 51 that can exchange information with the respective vehicles using a wireless LAN or the like and an advance information providing system that obtains the identification information φ9 and the advance information φ2 from the plurality of vehicles 101 to 109 that are located close to one another and provides the information to other vehicles. The central control system 50 can provide, after the arrangement of the vehicles 101 to 109 in the vehicle group has been established in the system, a specified vehicle with the positions of other vehicles relative to the specified vehicle and the advance information of the other vehicles on a vehicle by vehicle basis. By doing so, it is possible to prevent the processing performance of the individual vehicles from being used up in identifying other vehicles.

The central control system 50 includes a function 53 that designates the execution of a reveal operation by at least one out of the plurality of vehicles 101 to 109 assumed to be moving in a group close to one another as a target vehicle to make it possible to differentiate the behavior of the target vehicle from the other vehicles, and a function 54 that obtains the periphery information φ3 obtained from the respective vehicles, detects a reveal operation of the target, and completely identifies the plurality of vehicles by grasping the positions of the respective vehicles relative to the target vehicle.

Figure 3:
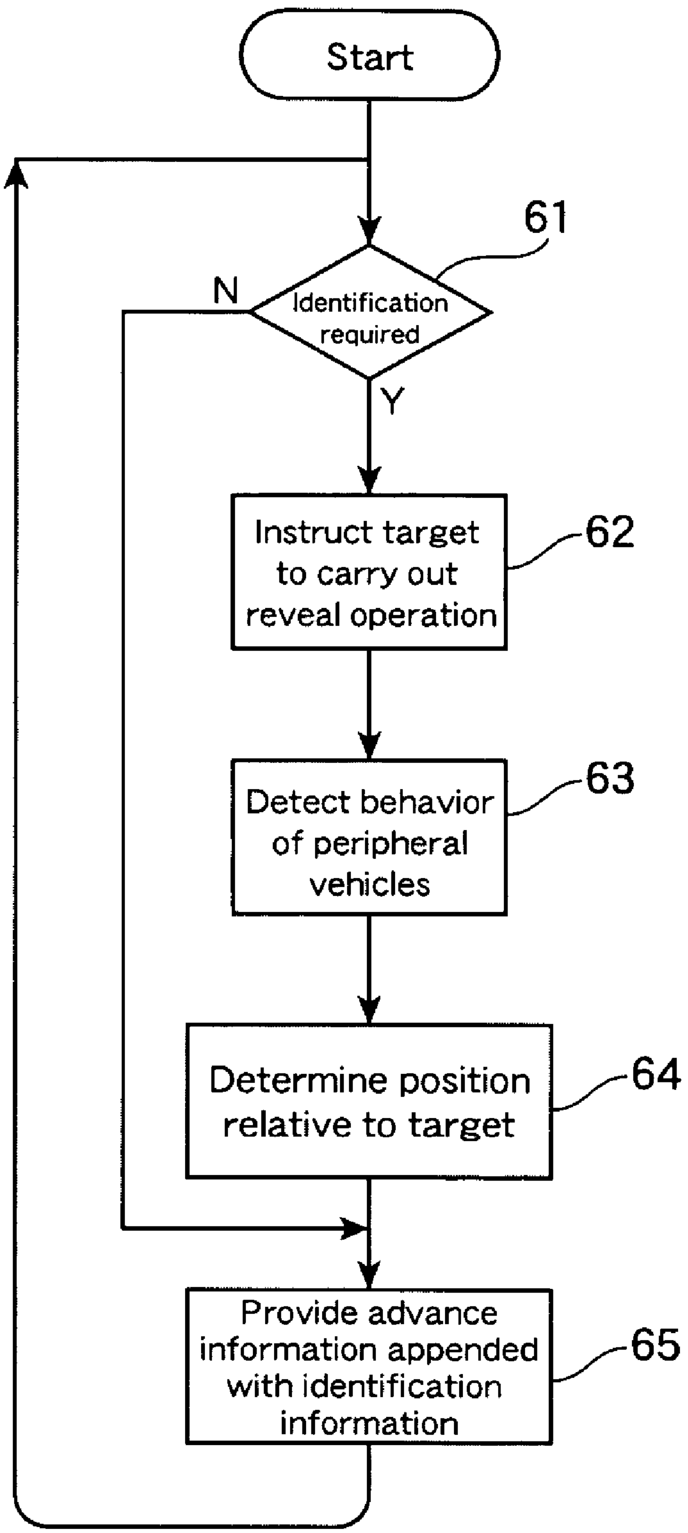
FIG. 3 is a diagram showing the processes in a method of identifying moving bodies in the present invention.

FIG. 3 is a flowchart showing the processing in the movement control system 10 installed in a vehicle or in the central control system 50, focusing on the processing when identifying vehicles. First, in step 61, when it is necessary to clarify the relative positional relationships of a plurality of vehicles that are moving in a group, in step 62 an instruction for carrying out the reveal operation is outputted to the target. If the present vehicle is the target, a reveal operation is carried out in step 62. When advance information including the reveal operation is provided from the target or the central control system 50, in step 63, the respective vehicles detect the behavior of the respective vehicles present nearby to discover the target that is carrying out the reveal operation. In step 64, the position of the present vehicle relative to the target is determined and the identification information and positional relationship relative to the target are transmitted to the other vehicles and the central control system 50 as necessary. When the positional relationship relative to the vehicles moving in the periphery and the identification information are known, in step 65, by obtaining the advance information $\phi$2, to which the identification information $\phi$9 is attached, from the movement control systems 10 of the other vehicles or from the central control system 50, it becomes possible to predict the behavior of the other vehicles in the periphery and therefore the present vehicle 1 can be controlled safely. In particular, by providing advance information including not only the speed and the direction of motion, that are the normal or continual movement state of the driving mechanism 9, but also the instructions $\phi$3 to the driving mechanism 9 such as a steering operation, braking operation, and an acceleration operation, other vehicles can predict not only the reveal operation of the target, but also the behavior of other vehicles, and therefore safety can be greatly improved for vehicles moving in a group.

When controlling vehicles equipped with a radio wave measuring function such as GPS and if the present positions of the respective vehicles are apart by a distance that sufficiently exceeds the range of tolerance of the radio wave measurement, it will be possible to identify the vehicles with sufficient precision without carrying out a reveal operation. If there is a function that can precisely grasp the movement paths that have been taken by the respective vehicles, it may be possible to grasp the present positions of the respective vehicles with sufficient precision from the movement paths. On such technologies, if it was possible to maintain the identities of the respective vehicles obtained before the respective vehicles approach one another and switch to moving in a group, it would be possible to identify the respective vehicles moving in the group without deciding a target and having a reveal operation carried out, and therefore the advance information from the respective vehicles can be transmitted between the vehicles and used effectively. However, since there is no position measuring function that can measure with sufficient accuracy for changes in position due to changing lanes and also no system that can trace movement paths with enough precision, so long as there is no clear difference in speed between vehicles or no clear difference in size such as between a large truck and a passenger automobile, in reality the relationship between the respective vehicles will be unclear when the vehicles switch to moving in a group.

So long as the positional relationships between vehicles can be stably maintained, "group movement" where a plurality of vehicles intentionally move in a formation is a state that is suited to the automatic control of vehicles. However, since a plurality of vehicles move comparatively close to one another, to reduce the possibility of a major accident, a vehicle should be driven carefully when a vehicle enters and leaves the group and react at high speed to changes in the behavior of respective vehicles due to some cause of instability, such as when one of the vehicles moving in the group breaks down, when a driver makes an unintended operation. According to the present invention, if the target has carried out a reveal operation and the identification information of the respective vehicles moving in a group has been made clear, the behavior of the respective vehicles can be transmitted to other vehicles using the advance information from the respective vehicles before the actual behavior of the respective vehicles are clearly observed from the outside. Accordingly, even in a state where a plurality of vehicles are moving at short distances from one another, the behavior of another vehicle can be predicted from the advance information and therefore it is possible to quickly respond to the behavior of the other vehicle. In addition, if the positional relationships between vehicles moving in a group are clearly identified, when the central control system 50 detects an error such as when a special operation instruction has been received from one of the vehicles moving in the group, it is possible to instruct other vehicles that are thought to be affected to take collective evasive action before the behavior of the vehicle in question becomes apparent.

The method of identifying moving bodies included in the present invention, and a movement control system and central control system that use the method are effective in controlling the movement and traveling of all kinds of moving bodies. In particular, when a plurality of moving bodies compose a group or are moving in a state that is close in a formation under the resolution of a position obtaining system for moving bodies such as GPS, the present invention is favorable for identifying the respective moving bodies that form the group or virtual group and the respective positions of the moving bodies. Although an example where four-wheel cars move on land has been described above, the present invention is not limited to four-wheel cars, and can clearly identify all kinds of vehicles including moving bodies such as motorcycles, trucks, and buses. Also, the invention is not limited to moving bodies that move on land and can be applied to moving bodies that move on water or in spaces such as through water or through air. For moving bodies that move through air, three-dimensional movement that is not just forward/backward/left/right movement but also includes up/down movement is favorable for a reveal operation.

The invention claimed is:

1. A method of monitoring behavior of a plurality of moving bodies, wherein each of the moving bodies includes:

means for transmitting, as advance information, a movement state including an operation instruction received by the each moving body, together with identification information of the each moving body, and means for monitoring behavior of the moving bodies, the method comprising:

designating one of the plurality of moving bodies as a target moving body and causing the target moving body to carry out a reveal operation that enables behavior of the target moving body to be differentiated from behavior of others of the plurality of moving bodies;

each of the plurality of moving bodies generating the operation instruction for controlling an operation of the each moving body;

each of the plurality of moving bodies transmitting the advance information and identification information of the each moving body;

transmitting the reveal operation;

detecting the reveal operation by the means for monitoring the behavior of the moving bodies;

each of the plurality of moving bodies transmitting information concerning a position of the each moving body relative to the target moving body;

receiving the information concerning the positions of each of the moving bodies relative to the target moving body; and identifying relative positions of the target moving body relative to each of the other moving bodies by monitoring the position information.

2. A movement control system comprising:

means for providing, as advance information, a movement state including an operation instruction received by a present moving body, together with identification information for the present moving body, to other moving bodies or a central control system and for obtaining advance information of the other moving bodies;

means for obtaining periphery information including behavior of the other moving bodies;

control means for generating an operation instruction based on the advance information and the periphery information;

means for designating one of the moving bodies as a target moving body;

means for outputting an instruction for the target moving body to carry out a reveal operation, wherein the reveal operation behavior of the target moving body to be differentiated from behavior of other of the moving bodies;

means for detecting a reveal operation of the target moving body based on the periphery information and determining a position of the present moving body relative to the target moving body; and means for transmitting the position of the present moving body relative to the target moving body together with the identification information to the other moving bodies or the central control system.

3. The movement control system according to claim 2, further comprising means for obtaining relative positions of other moving bodies and identification information of other moving bodies.

4. A moving body comprising a movement control system according to Claim 2.

5. A central control system comprising:

means for obtaining, from a plurality of moving bodies present nearby, a movement state of each of the moving bodies including an operation instruction received by each of the moving bodies together with identification information of the moving bodies, and providing the obtained information to other of the moving bodies as advance information;

means for designating one of the moving bodies as a target moving body;

means for instructing the target moving body to carry out a reveal operation that enables behavior of the target moving body to be differentiated from the other moving bodies; and means for obtaining information concerning directional relationships between the target moving body and the other moving bodies around the target moving body, and identifying the plurality of moving bodies by grasping relative arrangement of the plurality of moving bodies around the target moving body using the directional relationships.

6. A method of identifying a plurality of moving bodies that are present nearby, wherein each of the moving bodies includes means for transmitting, as advance information, a movement state including an operation instruction received by the moving body, together with identification information of the moving body, and means for monitoring behavior of others of the moving bodies; the method comprising:

designating one of the moving bodies as a target moving body and causing the target moving body to carry out a reveal operation that enables behavior of the target moving body to be differentiated from the other moving bodies;

detecting the reveal operation by the means for monitoring of the other moving bodies;

determining directional relationships between the target moving body and the other moving bodies respectively; and identifying an arrangement of the moving bodies.

* * * * *